(12) United States Patent
Aoki et al.

(10) Patent No.: US 6,580,562 B2
(45) Date of Patent: Jun. 17, 2003

(54) ON-VEHICLE DISPLAY UNIT

(75) Inventors: Kunimitsu Aoki, Shizuoka (JP);
Yoshihide Takada, Shizuoka (JP);
Takanori Watanabe, Shizuoka (JP);
Go Nakamura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 59 days.

(21) Appl. No.: 09/910,016

(22) Filed: Jul. 23, 2001

(65) Prior Publication Data
US 2002/0012173 A1 Jan. 31, 2002

(30) Foreign Application Priority Data

Jul. 24, 2000 (JP) .................................. 2000-222687
Aug. 10, 2000 (JP) .................................. 2000-242670

(51) Int. Cl.$^7$ .......................... G02B 27/14; G09G 5/00; G03B 21/00
(52) U.S. Cl. .................... 359/630; 359/634; 359/629; 359/633; 345/7; 345/8; 353/13
(58) Field of Search ................... 359/630, 633, 359/626, 13, 627, 629, 634, 639, 640; 345/7, 8, 9; 353/13, 28, 69

(56) References Cited

U.S. PATENT DOCUMENTS

| 4,892,386 A | * | 1/1990 | Suzuki et al. ............... 359/630 |
| 4,925,272 A | * | 5/1990 | Ohshima et al. ............ 359/630 |
| 4,988,976 A | * | 1/1991 | Lu .............................. 340/461 |
| 5,005,010 A | * | 4/1991 | Misaki et al. .................. 345/7 |
| 5,053,755 A | * | 10/1991 | Smith et al. ................... 345/7 |
| 5,506,595 A | * | 4/1996 | Fukano et al. ................. 345/7 |
| 5,646,639 A | * | 7/1997 | Koie .............................. 345/7 |
| 5,729,366 A | * | 3/1998 | Yang ............................ 359/13 |
| 6,443,573 B2 | * | 9/2002 | Aoki ........................... 353/13 |
| 2002/0018182 A1 | * | 2/2002 | Aoki ........................... 353/13 |

FOREIGN PATENT DOCUMENTS

| DE | 39 04 401 | 8/1989 |
| DE | 43 38 579 | 7/1994 |
| JP | 5-229366 | 9/1993 |
| JP | 6-48218 | 2/1994 |
| JP | 6-115381 | 4/1994 |
| JP | 6-144082 | 5/1994 |
| JP | 7-144557 | 6/1995 |
| JP | 7-257228 | 10/1995 |
| JP | 9-185012 | 7/1997 |

OTHER PUBLICATIONS

Copy of German Patent Office Action including translation for corresponding German Patent Application 101 35 986.1–51 dated May 28, 2002.

* cited by examiner

Primary Examiner—Evelyn Lester
Assistant Examiner—Jack Dinh
(74) Attorney, Agent, or Firm—Armstrong, Westerman & Hattori, LLP

(57) ABSTRACT

In the on-vehicle display unit 5, an indicated image on an indication surface 51*a* of the display 51 is reflected by a semi-transparent mirror 55 to be directed above a dashboard 1 through a window 59*b* formed in a cover plate 59*a* disposed on an upper surface 1*a* of the dashboard 1. Thereby, the image is projected on a windscreen 3. The semi-transparent mirror 55 is moved in a longitudinal direction of the vehicle, so that the vertical position of a projection point $P_1$ or $P_3$ of the image $S_1$ or $S_3$ on the windscreen 3 is changed such that the image is superimposed over the foreground at which a driver of the vehicle is looking. The cover plate 59*a* is supported by a cover support construction 59*c* so as to be movable in a longitudinal direction of the vehicle relative to the upper surface 1*a* of the dashboard 1.

16 Claims, 7 Drawing Sheets

ON-VEHICLE DISPLAY UNIT

BACKGROUND OF THE INVENTION

1. Field of the Invention

The present invention relates to an on-vehicle display unit that projects an image, which is displayed on a display disposed in a dashboard of a vehicle, on a windscreen or an auxiliary screen. The image is superimposed over the foreground which can be seen through the windscreen or the auxiliary screen.

2. Related Art

Such a on-vehicle display unit, which is called as a head-up display, allows a driver to see additional information necessary for an operation of the vehicle together with the foreground without a larger change of a sight line of the driver.

The on-vehicle display unit can compensate eye positions that are variable according to a physique or a position of the driver. Such on-vehicle display units are disclosed in Japanese Patent Applications Laid-open No. 5-229366, No. 6-48218, NO. 6-144082, and No. 7-144557.

In the prior arts, an image emitted from a display is projected on a windscreen or an auxiliary screen by way of a reflecting mirror. The mirror has an inclination angle which is variable to adjust a vertical position of the image on a windscreen or an auxiliary screen.

However, the change of the inclination angle of the mirror varies an incidence angle of light from the mirror on the windscreen or the auxiliary screen. Thereby, a reflection angle of the light on the windscreen varies. Thus, the inclination angle of the mirror should be varied delicately according to a vertical position of an eye so that the image is superimposed over the foreground.

By the way, a driver's sight line is directed generally to a point which is 10 to 20 meter ahead of a vehicle, although the point varies with the speed of the vehicle. The distance from the eye position to the sight point is considerably larger than the distance between the eye position and the windscreen, so that different vertical positions of the driver's eye cause almost no change of the angle of the driver's sight line relative to a roadway.

Thus, when the eye position is changed, the vertical shift distance of the image on the windscreen is preferably the same as the vertical shift distance of the eye position.

However, as described above, in the prior arts, the vertical shift of the image on the windscreen should be delicately adjusted relative to the vertical shift of the eye position. The change of the mirror inclination angle causes a shift of the image on the windscreen from the driver's sight line directed to an appropriate point of the foreground. This shows that the prior arts are susceptible to improvement.

Another of such on-vehicle display units is also disclosed in Japanese Patent Application Laid-open No. 7-257228. The on-vehicle display unit adjusts the vertical position of additional information on a windscreen to coincide with a present sight line of a driver. Furthermore, Japanese Patent Applications Laid-open No. 6-115381 and No. 9-185012 each disclose one of such on-vehicle display units which corrects the vertical position of additional information on a windscreen according to a vehicle's speed.

However, there has been no proposal which can keep a driver's sight line directed an appropriate point of the foreground when the vertical position of the driver's eye varies.

Moreover, another improvement is desired in the prior arts. The vertical adjustment of the image on the windscreen by changing the inclination angle of the mirror causes light reflected from the mirror to pass through different points of the dashboard. Thus, the dashboard should be provided with a window through which the variable reflected light can pass.

This makes the dashboard window larger, which requires an adequate measure for preventing entry of dust and contaminants into the dashboard.

SUMMARY OF THE INVENTION

In view of the aforementioned situation, an object of the invention is to provide an on-vehicle display unit which can see an image reflected from a windscreen of a vehicle together with the foreground visible through the windscreen. The on-vehicle display unit requires little change of a driver's sight line when the driver sees the image and the foreground in a superimposed relationship thereof, even when eye positions of the driver vary vertically according to a physique or a position of the driver.

Another object of the invention is to provide another on-vehicle display unit which can see an image reflected from a windscreen of a vehicle by way of a reflecting mirror together with the foreground visible through the windscreen. The reflecting mirror has an inclination angle variable with a driver's eye position which vertically changes according to a physique or a position of the driver. The on-vehicle display unit has a window defined in a dashboard for passing light reflected by the mirror, the window being able to appropriately prevent entry of dust and contaminants.

For achieving the first object of the invention, a first aspect of the invention is an on-vehicle display unit for projecting an image on a screen, the image displayed on a display in a dashboard of a vehicle, the screen disposed above the dashboard and extended diagonally in a vertical plane relative to a longitudinal direction of the vehicle, the screen being transparent so that the foreground is visible through the screen with the image projected on the screen being superimposed over the foreground. The on-vehicle display unit includes a reflecting mirror disposed in the dashboard for reflecting light emitted from the image displayed on the display toward the screen. The reflecting mirror can be located at any of different positions in a longitudinal direction of the vehicle.

Thus, when the longitudinal location of the mirror is changed in the dashboard, the image projected on the screen moves vertically with no change of an incidence angle of light reflected by the mirror toward the screen.

Hence, the on-vehicle display unit requires little change of a driver's sight line when the driver sees both the image and the foreground, even when eye positions of the driver vary vertically according to a physique or a position of the driver.

Preferably, the on-vehicle display unit further has a transfer mechanism supporting the mirror such that the mirror is movable in the longitudinal direction, wherein the transfer mechanism can locate the mirror at any of the different positions.

Thus, the longitudinal transfer of the mirror supported by the transfer mechanism can easily change the longitudinal position of the mirror in the dashboard.

Optionally, the screen has a curved surface with different inclination angles relative to the longitudinal direction, and the transfer mechanism has an inclination angle adjusting device for changing the inclination angle of the mirror relative to the longitudinal direction in conformity with the inclination angle of the curved screen surface on which the image is projected when the mirror is moved in the longitudinal direction.

Thereby, even when the screen has a curved surface with different inclination angles to the longitudinal direction, light delivered from the screen to a driver's eye keeps a substantially constant incidence angle to a longitudinal direction of the vehicle.

Preferably, the on-vehicle display includes a plurality of the mirrors and a reflecting mirror moving mechanism for selectively moving each of the mirrors forward and backward for reflecting light emitted from the image displayed on the display such that each of the mirrors can be located at each of the different positions in the longitudinal direction of the vehicle.

Thereby, the mirror moving mechanism can selectively move each of the mirrors forward and backward for reflecting light emitted from the image displayed on the display. This can easily change the longitudinal positions of the mirrors in the dashboard.

Optionally, the screen has a curved surface with different inclination angles relative to the longitudinal direction, and each of the mirrors has a predetermined inclination angle relative to the longitudinal direction according to the inclination angle of the screen surface on which the image is projected.

Thus, even when the screen has a curved surface with different inclination angles to the longitudinal direction, light reflected by the screen toward a driver's eye has a constant angle relative to the longitudinal direction of the vehicle. Hence, the on-vehicle display unit requires little change of a driver's sight line when the driver sees both the image and the foreground, even when eye positions of the driver vary vertically according to a physique or a position of the driver.

Preferably, the on-vehicle display further includes a second reflecting element spaced from the display in a longitudinal direction of the vehicle, and the mirror is a semi-transparent mirror which can pass partially light emitted from the display toward the second reflecting element, the second reflecting element reflecting the light toward the semi-transparent mirror such that the light is reflected toward the screen by the semi-transparent mirror.

Thus, the optical path from the display to the screen by way of both the second reflecting element and the mirror is much longer than the distance between the display and the screen. Thereby, a driver can easily focus on the foreground and the image emitted from the display.

Preferably, the on-vehicle display unit further includes an image magnifying optical element disposed in the dashboard for magnifying the image which is delivered to the semi-transparent mirror.

Even when the image is visible by way of the semi-transparent mirror, the reflecting element, and the screen for providing a lengthened focus distance, the image magnifying optical element can keep the image in an appropriate size for recognition.

Preferably, the image magnifying optical element is a Fresnel lens having a flat surface at one side thereof and a Fresnel surface at the other side thereof, the flat surface facing the second reflecting element in an optical axis direction of the image emitted from the display.

The Fresnel lens is disposed between the reflecting element and the semi-transparent mirror such that the Fresnel lens is in no interference relationship with the longitudinal movement of the semi-transparent mirror. This enables the image magnification as well as an elongated focusing distance of the image, which is better for the driver to see the superimposed image and the foreground.

Preferably, the on-vehicle display unit further includes a window disposed on an upper surface of the dashboard and a transfer mechanism for moving the window in a longitudinal direction of the vehicle, the window partially allowing light of the image reflected from the mirror to pass through the window toward the screen.

Thus, the longitudinal position of the window is adjusted according to the longitudinal position of the mirror. Thereby, the window can have a minimum size so that the entry of contaminants and undesirable eternal rays into the dashboard is minimized to surely project the image toward the screen.

Preferably, the on-vehicle display unit further includes a window closing mechanism for closing and opening the window.

Thus, the window closing mechanism can selectively close the window when the image of the display is not required to be projected on the screen. Thereby, the entry of contaminants and undesirable external rays into the dashboard is minimized.

A second aspect of the invention is an on-vehicle display unit for projecting an image on a screen by way of a reflecting mirror, the image displayed on a display in a dashboard of a vehicle, the screen disposed above the dashboard, the mirror being movable in the dashboard so that the image projected on the screen is movable. The on-vehicle display unit includes:

a window disposed on an upper surface of the dashboard, the window partially allowing light of the image reflected from the mirror to pass through the window toward the screen and a transfer mechanism for moving the window along the upper surface of the dashboard according to a variable position of the image projected on the screen.

The inclination angle and longitudinal position of the mirror are adjusted when eye positions vary vertically according to a physique or a position of the driver. With the adjustment of the mirror, the transfer mechanism moves the window along the upper surface of the dashboard. Thereby, the window can have a minimum size so that the entry of dust and contaminants into the dashboard is minimized.

Preferably, the mirror is inclined by a predetermined angle relative to a central optical axis of the image emitted from the display, the mirror being movable in the dashboard so as to align with the central optical axis, and the transfer mechanism can move the window to align the window with the central optical axis.

Thus, the transfer mechanism moves the window to face the optical axis so that the window is surely positioned to cooperate with the mirror.

Preferably, the mirror is supported by a holder, and the window is defined in a cover movably supported on the upper surface of the dashboard to align with the optical axis, the cover attached to the holder through a connection member.

Thus, the window moves in response to the movement of the mirror so that the window is always positioned to appropriately cooperate with the mirror.

Preferably, the window is defined in a cover movable on the upper surface of the dashboard in conformity with a variable position of the image on the screen, and the cover has a plurality of bar plates which are joined to one another along a folding line intersecting with a movement direction of the cover, each bar plate being foldable along the folding line.

Thus, even when the cover moves on a curbed surface of the dashboard, the cover consisting of the foldable plate bars can overlay along the curved surface.

Preferably, the on-vehicle display unit further includes a closing mechanism for closing and opening the window.

Thus, the window closing mechanism can selectively close the window when the image of the display is not desired to be projected on the screen. Thereby, the entry of contaminants and undesirable external rays into the dashboard is minimized.

Preferably, the window is covered by a transparent cover having a surface facing upward from the dashboard, the surface being treated with by a reflection limiting process.

Thus, the cover prevents the entry of contaminants into the dashboard and also prevents an undesirable reflection of external rays on the cover not to be glare for the driver.

Preferably, the on-vehicle display unit further includes a transparent cover for covering the window and a shade defined at a periphery of the window, the shade raised from the upper surface of the dashboard, the cover having a surface facing upward above the dashboard, the surface being able to reflect light projected on the surface toward the shade.

Thus, the cover prevents the entry of contaminants into the dashboard, and the shade prevents the undesirable reflection of rays from the cover to eliminate glare for the driver.

DETAILED DESCRIPTION OF PREFERRED EMBODIMENTS

Referring to the accompanied drawings, embodiments of an on-vehicle display unit according to the present invention will be discussed.

Figure 1:
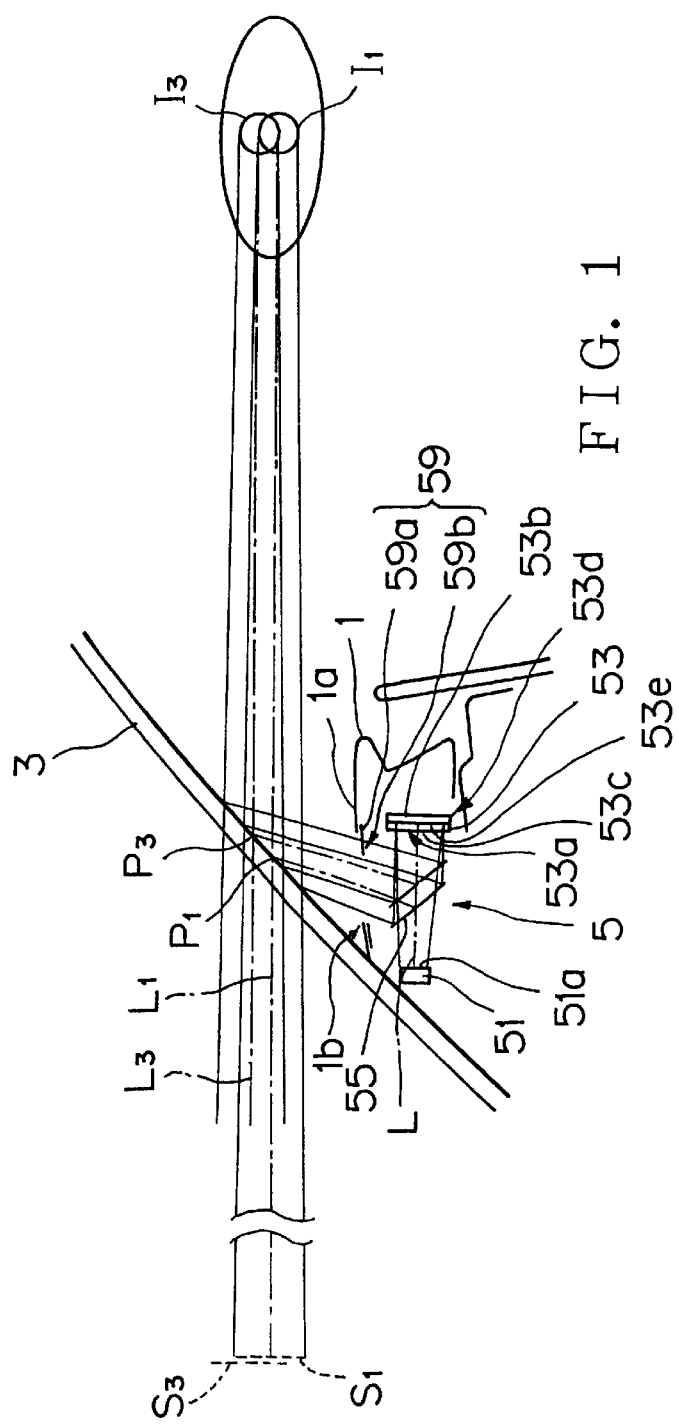
FIG. 1 is a sectional view illustrating a principal configuration of an on-vehicle display unit of an embodiment according to the present invention.

FIG. 1 is a schematic sectional view illustrating a general configuration of an embodiment of an on-vehicle display unit according to the present invention. In FIG. 1, reference numeral 5 designates the on-vehicle display unit which is accommodated in a dashboard 1 of the vehicle. The on-vehicle display unit 5 projects an image, which is displayed on a display disposed in the dashboard, on a windscreen 3 (corresponding to the screen described in the invention summary), the image being superimposed over the foreground which can be seen through the windscreen. The windscreen 3, which is disposed above an upper surface 1a of the dashboard 1, has a substantially uniform inclination relative to a longitudinal direction of the vehicle.

The on-vehicle display unit 5 includes a display 51, a magnifying mirror 53, a semi-transparent mirror 55, a mirror transfer mechanism 57 (see FIG. 3), a cover unit 59, etc.

The display 51 is a light-emitting device display (for example, a field-emission display, an electron-ray indicator tube, an electroluminescence display, etc.), a liquid-crystal display having a backlight, or the like. The display 51 has an indication surface 51a facing in a backward direction of the vehicle. On the indication surface 51a, there is provided an image (not shown) including information related to the navigation and speed of the vehicle.

Figure 2:
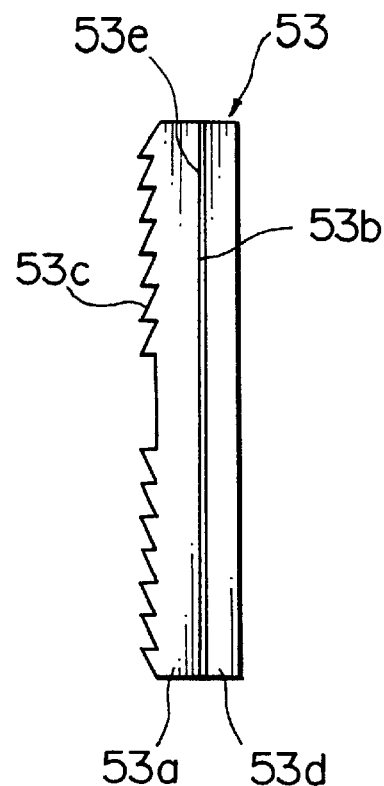
FIG. 2 is an enlarged side view showing a magnifying mirror of FIG. 1.

The magnifying mirror 53, illustrated in FIG. 2, is constituted by a Fresnel lens 53a (corresponding to the image magnifying optical element described in the invention summary) and a reflecting mirror 53d (corresponding to the second reflecting element described in the invention summary). The Fresnel lens 53a has a flat surface 53b, and the mirror 53d has a reflection surface 53e. The flat surface 53b is brought into intimate contact with the reflection surface 53e by evaporation. The Fresnel lens 53a has a Fresnel surface 53c in the opposite side of the flat surface 53b. As illustrated in FIG. 1, the Fresnel surface 53c faces the indication surface 51a of the display 51 with a space therebetween in a backward direction of the vehicle.

The semi-transparent mirror 55 is supported by the transfer mechanism 57 such that the semi-transparent mirror 55 aligns with an optical axis L of an image (not shown) emitted from the display 51 to the magnifying reflecting mirror 53.

Figure 3:
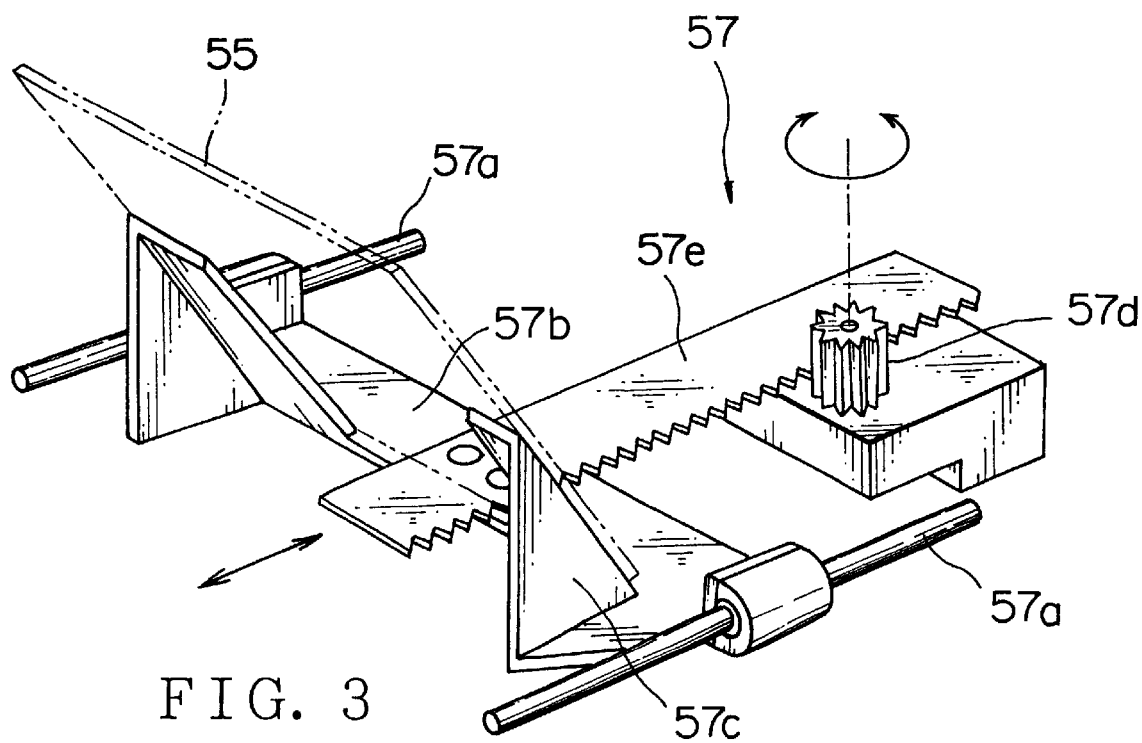
FIG. 3 is an enlarged perspective view showing a transfer mechanism of a semi-transparent mirror of FIG. 1.

As illustrated in FIG. 3, more particularly, the transfer mechanism 57 has a pair of the guide shafts 57a, 57a parallel extended in a longitudinal direction of the vehicle, a slide 57b slidable on the guide shafts 57a, 57a, and a holder 57c defined in the slide 57b.

The holder 57c receives the semi-transparent mirror 55 such that, as illustrated in FIG. 1, the semi-transparent mirror 55 is inclined toward the display 51 to have a predetermined angle relative to an optical axis L of the emitted image (not shown). The semi-transparent mirror 55 is located between the display 51 and the magnifying mirror 53 so as to align with the optical axis L. The semi-transparent mirror 55 is movable along the optical axis L, that is, in a longitudinal direction of the vehicle.

As illustrated in FIG. 3, the transfer mechanism 57 further has a pinion 57d located in a side of the dashboard 1 and a rack 57e engaged with the pinion 57d. The rack 57e is fixed on the slide 57b. The turning of the pinion 57d by an electric motor or by hand moves the semi-transparent mirror 55 and the slide 57b in a longitudinal direction of the vehicle in accordance with a vertical position change (described later) of an eye position $I_1$ or $I_3$ (FIG. 1).

The cover 59 has a cover plate 59a and a window 59b formed in the cover plate 59a. The cover plate 59a covers an opening 1b defined in the upper surface 1a of the dashboard 1.

In this embodiment, the opening 1*b* formed in the upper surface 1*a* of the dashboard 1 has a longitudinal dimension according to the longitudinal movement distance of the slide 57*b*. The cover plate 59*a* is supported by a cover support construction 59*c* so as to be movable in a longitudinal direction of the vehicle.

Figure 4:
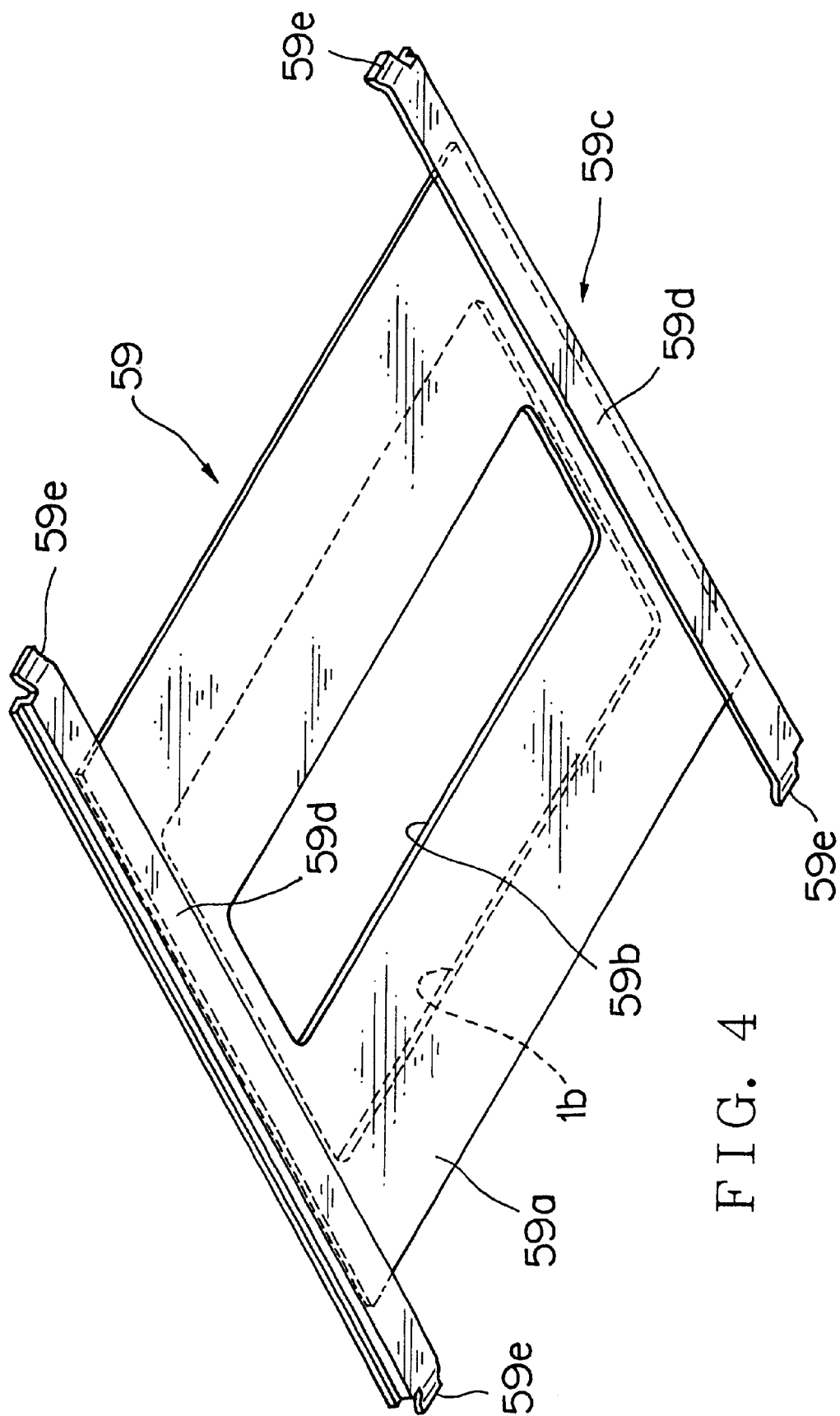
FIG. 4 is a perspective view showing a rear (inner) side portion of an upper plate of a dashboard illustrated in FIG. 1.

As illustrated in FIG. 4 which is a perspective view taken from a rear side (inner side) of the dashboard 1 for showing the upper surface 1*a* of the dashboard 1, the cover support construction 59*c* (corresponding to the window moving mechanism described in the invention summary) is provided with generally L-shaped right and left guide rails 59*d*, 59*d* each fitted on a rear surface of the upper surface 1*a* of the dashboard 1 at each side of the opening 1*b*. The guide rails 59*d*, 59*d* support each side end of the cover plate 59*a* such that the cover plate 59*a* is movable in a longitudinal direction of the vehicle.

Each guide rail 59*d* is formed with a stopper piece 59*e* at each longitudinal end thereof by a bending process. The stopper piece 59*e* limits the longitudinal movement of the cover plate 59*a* such that the window 59*b* is longitudinally located within the opening 1*b* of the dashboard 1.

Next, an operation of thus configured on-vehicle display unit 5 of the embodiment will be discussed.

Referring to FIG. 1, the cover plate 59*a* of the cover 59 is preliminarily adjusted in a longitudinal direction of the vehicle so that the semi-transparent mirror 55 is longitudinally located in conformity with the window 59*b*. The display 51 indicates an image (not shown) including information necessary for a vehicle operation. The image is emitted from the indication surface 51*a* of the display 51 to the semi-transparent mirror 55 disposed between the indication surface 51*a* and the magnifying mirror 53 opposed to the indication surface 51*a*.

Since the semi-transparent mirror 55 is inclined toward the display 51 to have a predetermined angle relative to an optical axis L of the emitted image, a part of the received image on the semi-transparent mirror 55 is reflected toward a lower side of the dashboard 1, while the other part of the received image passes through the semi-transparent mirror 55 to come to the magnifying mirror 53.

The projected image on the magnifying mirror 53 passes through the Fresnel lens 53*a* from the Fresnel surface 53*c* to the flat surface 53*b* thereof. The flat surface 53*b* is brought into intimate contact with the reflection surface 53*e* of the mirror 53*d* which reflects the image toward the Fresnel surface 53*c*, so that the image passes again through the Fresnel lens 53*a* toward the display 51.

The image, which has passed through the Fresnel lens 53*a* twice, is magnified by a light convergence effect of the Fresnel lens 53*a*. The magnified image reaches the semi-transparent mirror 55 on the way to the display 51.

The image which has reached the semi-transparent mirror 55 again is reflected upward above the dashboard 1 to pass through the window 59*b* of the cover plate 59*a* to reach the windscreen 3 on which the image is projected.

Hence, a vehicle driver can see a virtual image $S_1$ projected at a projection point $P_1$ of the windscreen 3. The projection point $P_1$ is positioned on a sight line $L_1$ of the driver who is looking at the foreground located approximately 10 to 20 meter ahead from the vehicle through the windscreen 3. An eye position $I_1$ of the driver is positioned just back of the projection point $P_1$ of the image on the windscreen 3. The 10 to 20 meter distance form the vehicle to the focused foreground is generally appropriate during operation of the vehicle.

When the semi-transparent mirror 55 is moved backward to a second position illustrated by an imaginary line as shown in FIG. 1, the cover plate 59*a* of the cover 59 is also moved backward so that the window 59*b* moves in conformity with the movement of the semi-transparent mirror 55. The image indicated on the indication surface 51*a* of the display 51 is emitted to pass through the semi-transparent mirror 55 and to make a round-trip in the Fresnel lens 53*a*. Then, the image magnified by the Fresnel lens 53*a* reaches the semi-transparent mirror 55 on the way to the display 51, and a part of the magnified image is reflected upward by the semi-transparent mirror 55 toward the dashboard 1, which passes through the window 59*b* of the cover plate 59*a* to be projected on the windscreen 3.

Since the semi-transparent mirror 55 is moved backward, the projection point $P_3$ of the image on the windscreen 3 is moved above the projection point $P_1$ corresponding to the first position of the semi-transparent mirror 55. Thus, the projection point $P_3$ is positioned on a sight line $L_3$ of the driver who is looking at the foreground located approximately 10 to 20 meter ahead from the vehicle through the windscreen 3. Thus, a virtual image $S_3$ is superimposed over the foreground. The eye position $I_3$ of the driver is positioned just back of the projection point $P_3$ of the image on the windscreen 3.

Hence, an upward movement of the driver's eye position requires a backward movement of the semi-transparent mirror 55, while a downward movement of the driver's eye position requires a forward movement of the semi-transparent mirror 55 so that the image is positioned on a sight line which allows the driver to see the foreground approximately 10 to 20 meter ahead from the vehicle.

In a modified embodiment, an upward movement of the driver's eye position requires a backward movement of the semi-transparent mirror 55 and a backward movement of the cover plate 59*a* of the cover 59 such that the window 59*b* is located in conformity with the position of the semi-transparent mirror 55. Meanwhile, a downward movement of the driver's eye position requires a forward movement of the semi-transparent mirror 55 and a forward movement of the cover plate 59*a* of the cover 59 such that the window 59*b* is located in conformity with the position of the semi-transparent mirror 55. Thus, the image is positioned on a sight line which allows the driver to see the foreground 10 to 20 meter ahead from the vehicle.

Note that the longitudinal positions of the virtual image $S_1$ and $S_3$ are almost the same as each other, although the virtual images $S_1$ and $S_3$ are illustrated to be spaced from each other for the sake of clarity in FIG. 1.

Thus, in the on-vehicle display unit 5 of the embodiment, the semi-transparent mirror 55 is movable in a longitudinal direction of the vehicle for reflecting the image emitted from the indication surface 51*a* of the display 51 by the semi-transparent mirror 55 to project the image on the windscreen 3 so that the driver can see the virtual image $S_1$ or $S_3$ superimposed over the foreground visible through the windscreen 3.

Accordingly, the on-vehicle display unit requires little change of a driver's sight line $L_1$ or $L_3$ when the driver sees both the virtual image $S_1$ or $S_3$ and the foreground visible through the windscreen 3 even when the eye position $I_1$ or $I_3$ varies vertically according to a physique or a position of the driver.

The window 59*b* of the cover plate 59*a* may be always open like the embodiment or may be provided with a closing lid (corresponding to the window closing mechanism described in the invention summary). The closing lid closes the window 59b when the superimposed projection of the image is not requested. Thereby, the entry of contaminants and undesirable external rays into the dashboard 1 is eliminated, so that the display 51 is advantageously prevented from a failure due to heat of the rays.

Figure 6:
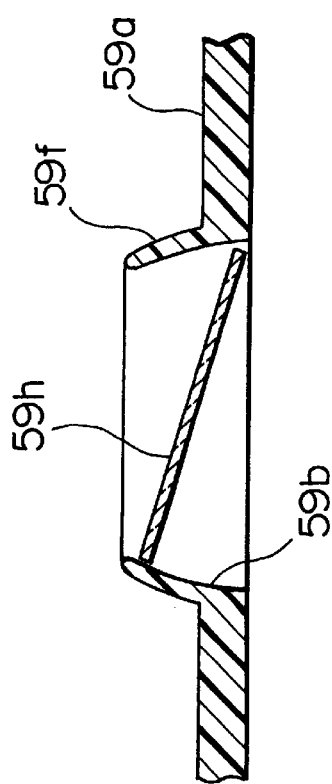
FIG. 6 is a general sectional view showing another modified example of the cover unit illustrated in FIG. 1.
Figure 5:
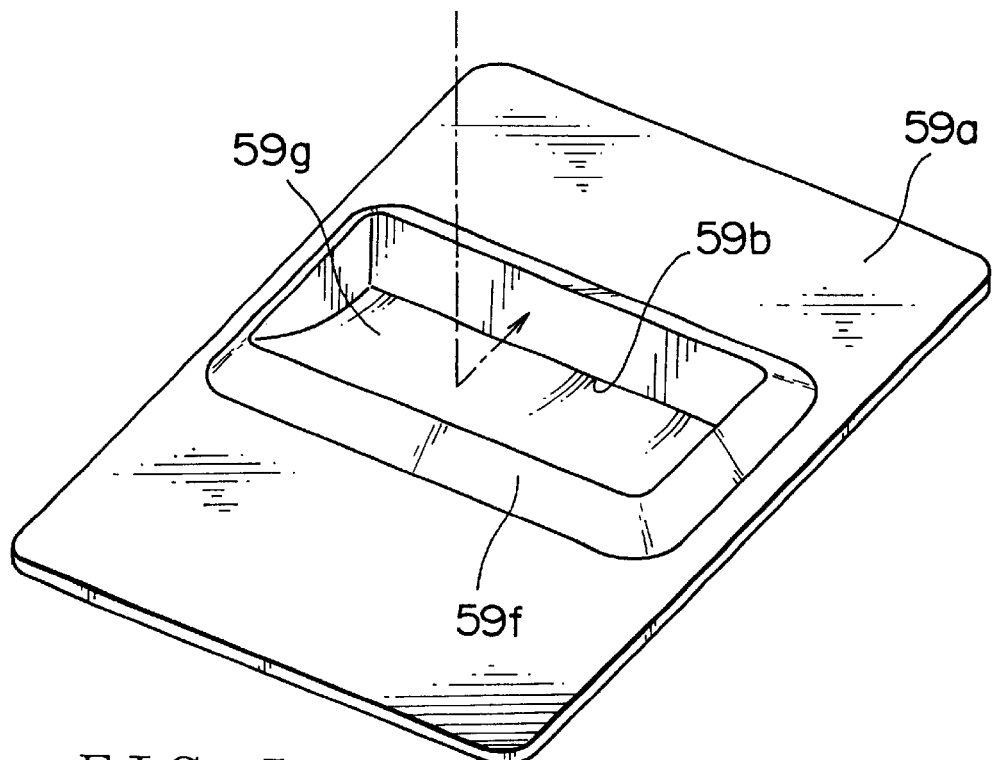
FIG. 5 is an enlarged perspective view showing a modified example of a cover unit illustrated in FIG. 1.

In place of the closing lid provided on the window 59b, there may be formed with a shade 59f rising from a periphery of the window 59b of the cover plate 59a, as illustrated in FIG. 5. Furthermore, a transparent curved panel 59g may be provided to be engaged with the window 59b within the window so that the curved panel 59g reflects external rays toward the shade 59f to prevent the external rays from entering the dashboard 1. As illustrated in FIG. 6, another transparent panel 59h which is surface-treated by an anti-reflection process may be provided in place of the curved panel 59g.

Figure 7:
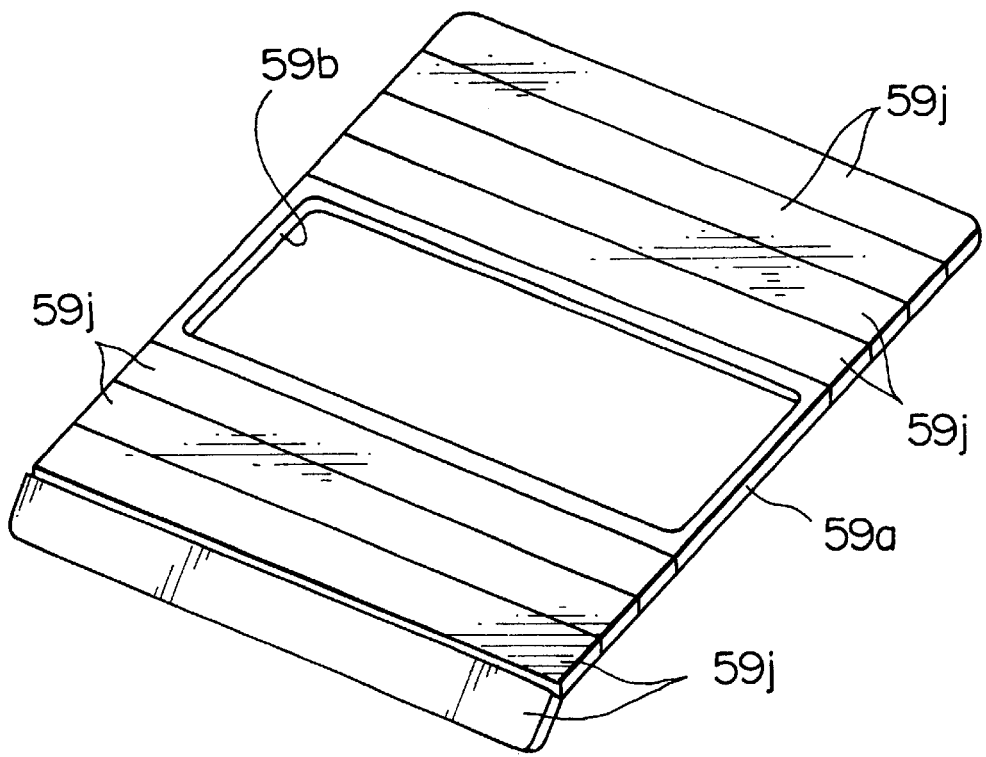
FIG. 7 is a schematic perspective view showing another modified example of the cover unit illustrated in FIG. 1.

As illustrated in FIG. 7, when the cover plate 59a moves to be extended from the upper surface 1a of the dashboard 1, the cover plate 59a preferably has a plurality of plate bars 59j foldably coupled to one another to overlie along a curved surface of the dashboard 1.

Figure 9:
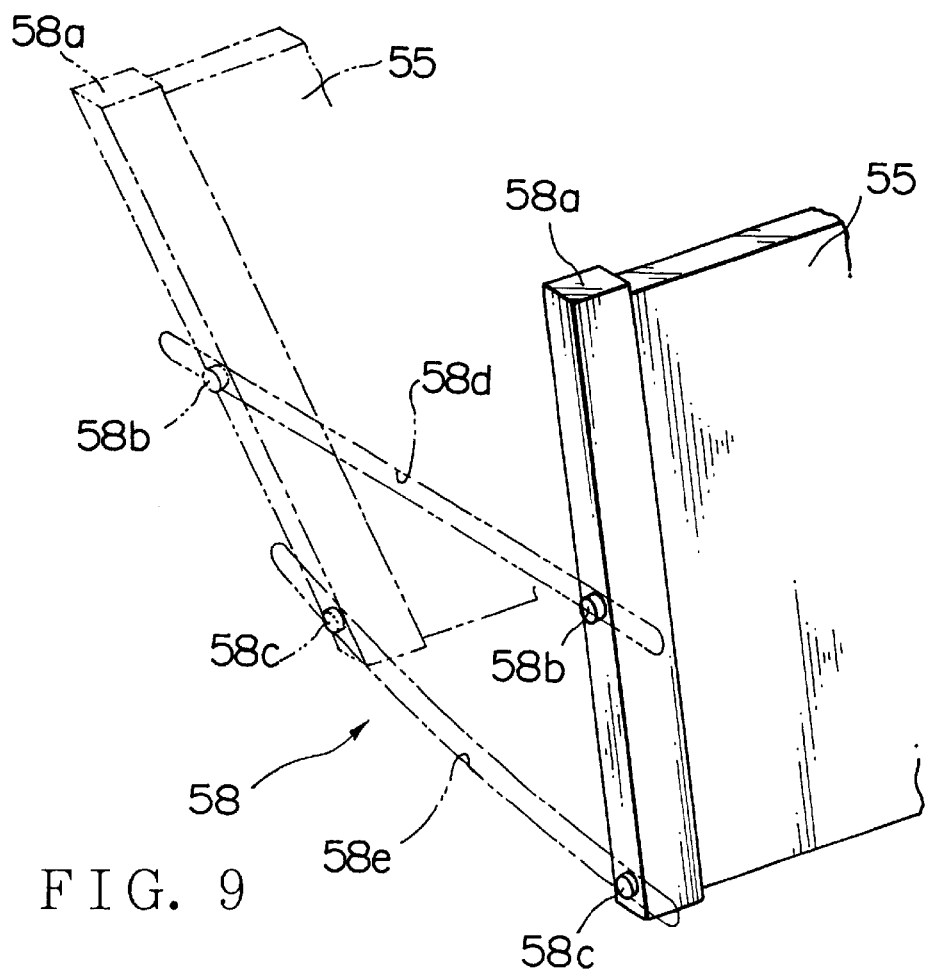
FIG. 9 is a schematic perspective view showing a transfer mechanism of a semi-transparent mirror of FIG. 8, the mechanism being able to adjust an inclination angle of the semi-transparent mirror.

In the aforementioned embodiment, the windscreen 3 has a generally uniform inclination relative to the longitudinal direction of the vehicle. However, a windscreen of another vehicle has an inclination variable in a longitudinal direction of the vehicle as illustrated in FIG. 9. In connection with such windscreens, a transfer mechanism 58 with an angle adjusting mean is better provided, which is illustrated in FIG. 9.

The transfer mechanism 58 with the angle adjusting mean includes a pair of holders 58a, 58a each engaged with each of left and right ends of the semi-transparent mirror 55, guide pins 58b, 58c each projected from a vertically middle portion or a lower end portion of each holder 58a, a horizontally elongated guide slot 58d for receiving the guide pins 58b, 58b, and another horizontally elongated guide slot 58e for receiving the guide pins 58c, 58c. The space between the guide slots 58d and 58e gradually decreases in a forward direction of the vehicle.

The transfer mechanism 58 has a driving mean (not shown), which may be an electrical one like a motor or a hand assisted one like a dial for longitudinally moving the guide pins 58b along the guide slot 58d.

The transfer mechanism 58 operated by the driving mean (not shown) moves the guide pins 58b along the guide slot 58d, so that the vertical distance between the guide pins 58b and 58c varies, thereby changing the longitudinal distance between the guide pins 58b and 58c. The more longitudinal advancement of the semi-transparent mirror 55 causes the more forward inclination of the semi-transparent mirror 55.

Figure 8:
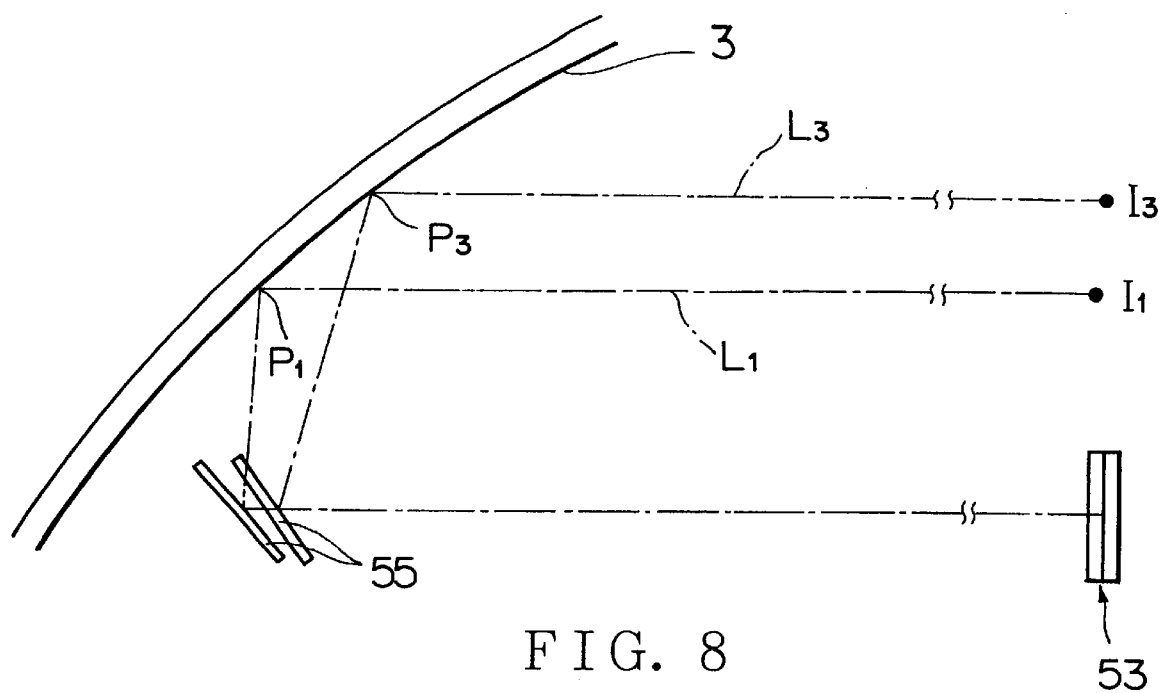
FIG. 8 is a sectional view illustrating a principal configuration of an on-vehicle display unit of a modified embodiment according to the present invention.

Thus, even when the screen 3 has a curved surface with different inclination angles to the longitudinal direction as illustrated in FIG. 8, light reflected by the screen toward a driver's eye has a constant angle relative to the longitudinal direction of the vehicle. Hence, the on-vehicle display unit requires little change of a driver's sight line $L_1$ or $L_3$ when the driver sees both the superimposed image and the foreground, even when eye positions $I_1$ or $I_3$ of the driver vary vertically according to a physique or a position of the driver.

In the embodiment, the semi-transparent mirror 55 is moved by the transfer mechanism 57 in a longitudinal direction of the vehicle. Alternatively, the on-vehicle display unit may include a plurality of semi-transparent mirrors 55 and a mirror moving mechanism (not shown) for selectively moving each of the mirrors 55 forward and backward for reflecting light emitted from the image displayed on the display 51 such that each of the mirrors 55 can be located at each of the plural different positions in a longitudinal direction of the vehicle. The inclination angle of the semi-transparent mirror 55 may be adjustable if desired.

When a vehicle has a curved windscreen 3 as illustrated in FIG. 8, each of the semi-transparent mirrors 55 may have a longitudinal inclination angle different from each other in accordance with the longitudinal position of the semi-transparent mirror 55.

The magnification of the image by the Fresnel lens 53a of the magnifying mirror 53 may be omitted when undesired. In that case, an ordinary mirror is provided in place of the magnifying mirror 53. However, the magnification of the image by the Fresnel lens 53a is better provided to make a focus point of the virtual image $S_1$ or $S_3$ nearer to the foreground visible through the windscreen 3. Because, a lengthened focus point of the image makes the image smaller.

The elongation of the optical path length, which is obtained by reflecting the image by means of the mirror 53d of the magnifying mirror 53, may be omitted. In that case, the semi-transparent mirror 55 is replaced by an ordinary mirror, and the display 51 is located at the position of the magnifying mirror 53 so that an image emitted from the display 51 is reflected by the ordinary mirror toward the windscreen 3.

However, the elongation of the optical path length, which is obtained by reflecting the image by means of the magnifying mirror 53, is advantageous for making the focus points of the virtual images $S_1$ and $S_3$ appropriately remote forward from the windscreen 3 in consideration of a limited space for the on-vehicle display unit 5 within the dashboard 1.

For magnification of the image, there may be provided a curved mirror having a spherical surface or another curved surface in place of the Fresnel lens 53a applied for the embodiment. The curved mirror functions substantially the same as the mirror 53d.

For magnification of the image, there may be provided a convex lens in place of the Fresnel lens 53a. The convex lens may have a flat surface at one side thereof, and the flat surface is brought into intimate contact with the mirror 53d by evaporation to define a magnifying mirror. Alternatively, the convex lens may have a curved surface at each side thereof, the convex lens being separated from the mirror 53d to define a magnifying mirror mean.

In the embodiment, the inclination angle of the semi-transparent mirror 55 is predetermined. Actually, the inclination angle is determined in consideration of inclinations of the windscreen 3 at the projection points $P_1$, $P_3$, the longitudinal and vertical positions of the projection points $P_1$, $P_3$ relative to the semi-transparent mirror 55, directions of the sight lines $L_1$, $L_3$ from the eye positions $I_1$, $I_3$ of a driver, and etc. According to the inclination angle of the semi-transparent mirror 55, the longitudinal positions of the cover plate 59a and the window 59b in the upper surface 1a of the dashboard 1 are determined.

In the embodiment, the screen is discussed as the windscreen 3. However, the screen may be an auxiliary screen disposed just inside the windscreen 3 on which the image is projected.

In a modified embodiment of the on-vehicle display unit 5 of the present invention, an indicated image on the indication surface 51a of the display 51 is reflected by the semi-transparent mirror 55 to be directed above the dashboard 1 through the window 59b formed in the cover plate 59a disposed on the upper surface 1a of the dashboard 1. Thereby, the emitted image is projected on the windscreen 3. The semi-transparent mirror 55 is moved in a longitudinal direction of the vehicle so that the vertical position of the projection point $P_1$ or $P_3$ of the virtual image $S_1$ or $S_3$ on the windscreen 3 is changed to be visible together with the foreground along the sight line $L_1$ or $L_3$ from the eye position $I_1$ or $I_3$. The cover plate 59a is movably supported by the cover support construction 59c to be movable in a longitudinal direction of the vehicle relative to the upper surface 1a of the dashboard 1.

Therefore, the window 59b is defined in a minimum opening, decreasing entry of dust and contaminants into the dashboard 1 from the window 59b, and the window 59b is always positioned in conformity with the longitudinal position of the semi-transparent mirror 55 so that the image reflected by the semi-transparent mirror 55 can be surely emitted above the dashboard 1.

Figure 10:
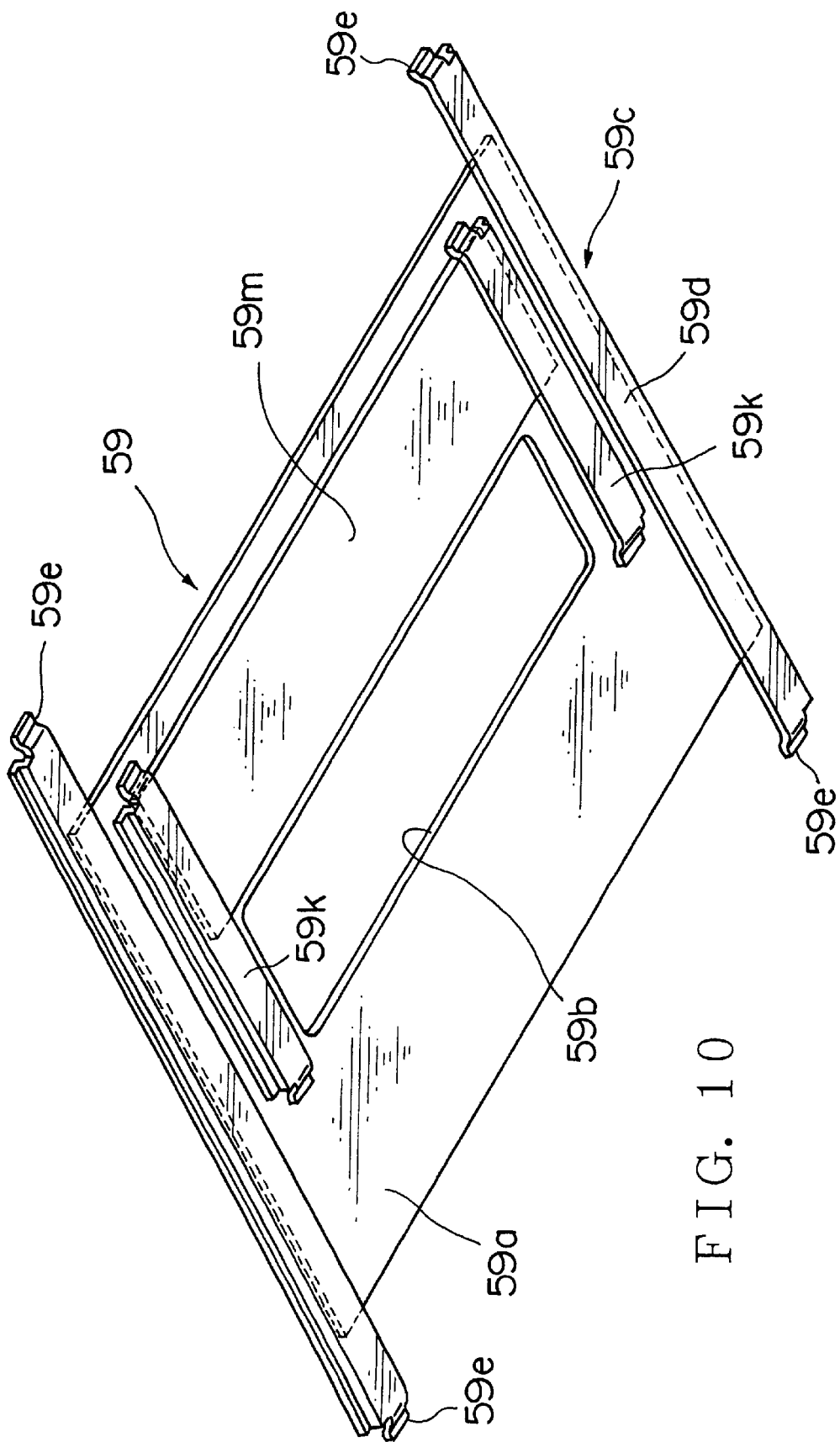
FIG. 10 is a perspective view showing a rear (inner) side portion of an upper plate of a dashboard illustrated in FIG. 1, in which a cover unit having a closing lid is illustrated.

The window 59b of the cover plate 59a may be always open like one of the embodiments or may be provided with a closing lid 59m (corresponding to the window closing mechanism described in the invention summary). The closing lid 59m is attached on left and right guide rails 59k, 59k disposed on a rear surface of the cover plate as illustrated in FIG. 10. The closing lid 59m closes the window 59b when the superimposed projection of the image is not requested.

This arrangement surely prevents entry of dust and contaminants into the dashboard 1 through the window 59b by closing the window 59b with the closing lid 59m. In addition, the display 51 is advantageously prevented from a failure due to heat of external rays during a non-operating state of the vehicle.

In the embodiment, the cover plate 59a of the cover 59 is movably supported by the cover support construction 59c on the upper surface 1a of the dashboard 1 to be movable in a longitudinal direction of the vehicle with being independent from the semi-transparent mirror 55. However, the cover plate 59a may be moved in a longitudinal direction of the vehicle according to the longitudinal movement of the semi-transparent mirror 55 such that the window 59b is located in conformity with the position of the semi-transparent mirror 55.

Figure 11:
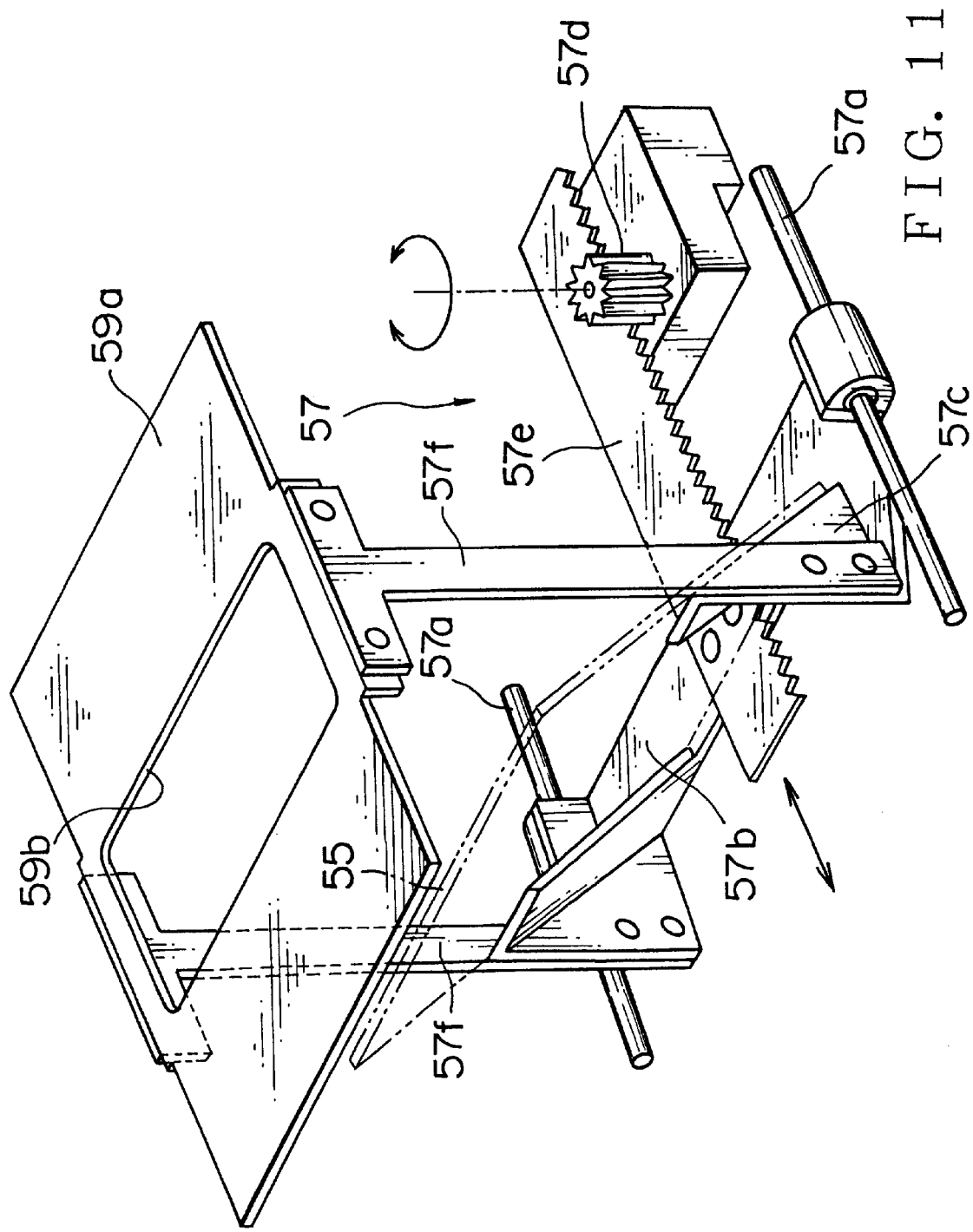
FIG. 11 is an enlarged perspective view showing another modified embodiment having a cover unit in which a cover plate is joined to a transfer mechanism of the semi-transparent mirror of FIG. 1.

In an example of such arrangement, as illustrated in FIG. 11, the holder 57c of the transfer mechanism 57 is fitted with a generally T-shaped connection member 57f at each side end thereof. Each connection member 57f has an upper end joined to each side end of the cover plate 59a.

In the aforementioned embodiments, the cover plate 59a having the window 59b is longitudinally movable in response to the longitudinal movement of the semi-transparent mirror 55. The projecting point of the image on the windscreen 3 may be movable in a lateral direction of the vehicle by the movement of the semi-transparent mirror 55 or by an inclination angle adjustment of the semi-transparent mirror 55. In this case, the cover plate 59a having the window 59b is configured to be movable in a lateral direction of the vehicle.

What is claimed is:

1. An on-vehicle display unit for projecting an image on a screen, the image displayed on a display in a dashboard of a vehicle, the screen disposed above the dashboard and extended diagonally in a vertical plane relative to a longitudinal direction of the vehicle, the screen being transparent so that the foreground is visible through the screen with the image projected on the screen being superimposed over the foreground, the on-vehicle display unit comprising:

a reflecting mirror disposed in the dashboard for reflecting light emitted from the image displayed on the display toward the screen;

wherein the reflecting mirror can be located at a plurality of different positions in a longitudinal direction of the vehicle; and a second reflecting element spaced from the display in a longitudinal direction of the vehicle, and the mirror is a semi-transparent mirror which can pass partially light emitted from the display toward the second reflecting element, the second reflecting element reflecting the light toward the semi-transparent mirror such that the light is reflected toward the screen by the semi-transparent mirror.

2. The on-vehicle display unit as claimed in claim 1 which further comprises a transfer mechanism supporting the mirror such that the mirror is movable in the longitudinal direction, wherein the transfer mechanism can locate the mirror at any of the different positions.

3. The on-vehicle display unit as claimed in claim 2 wherein the screen has a curved surface with different inclination angles relative to the longitudinal direction, and the transfer mechanism has an inclination angle adjusting device for changing the inclination angle of the mirror relative to the longitudinal direction in conformity with the inclination angle of the curved screen surface on which the image is projected when the mirror is moved in the longitudinal direction.

4. The on-vehicle display unit as claimed in claim 1 comprising a plurality of the mirrors and a mirror moving mechanism for selectively moving each of the mirrors forward and backward for reflecting light emitted from the image displayed on the display such that each of the mirrors can be located at each of the different positions in the longitudinal direction of the vehicle.

5. The on-vehicle display unit as claimed in claim 4 wherein the screen has a curved surface with different inclination angles relative to the longitudinal direction, and each of the mirrors has a predetermined inclination angle relative to the longitudinal direction according to the inclination angle of the screen surface on which the image is projected.

6. The on-vehicle display unit as claimed in claim 1 which further comprises an image magnifying optical element disposed in the dashboard for magnifying the image which is delivered to the semi-transparent mirror.

7. The on-vehicle display unit as claimed in claim 6 wherein the image magnifying optical element is a Fresnel lens having a flat surface at one side thereof and a Fresnel surface at the other side thereof, the flat surface facing the second reflecting element in an optical axis direction of the image emitted from the display.

8. The on-vehicle display unit as claimed in claim 1 which further comprises a window disposed on an upper surface of the dashboard and a transfer mechanism for moving the window in a longitudinal direction of the vehicle, the window partially allowing light of the image reflected from the mirror to pass through the window toward the screen.

9. The on-vehicle display unit as claimed in claim 8 which further comprises a window closing mechanism for closing the window.

10. An on-vehicle display unit for projecting an image on a screen by way of a mirror, the image displayed on a display in a dashboard of a vehicle, the screen disposed above the dashboard, the mirror being movable in the dashboard so that the image projected on the screen is movable, the on-vehicle display unit comprising:

a window disposed on an upper surface of the dashboard, the window partially allowing light of the image reflected from the mirror to pass through the window toward the screen and a transfer mechanism for moving the window along the upper surface of the dashboard according to a variable position of the image projected on the screen.

11. The on-vehicle display unit as claimed in claim 10 wherein the mirror is inclined by a predetermined angle relative to a central optical axis of the image emitted from the display, the mirror being movable in the dashboard so as to align with the central optical axis, and the transfer mechanism can move the window to align the window with the central optical axis.

12. The on-vehicle display unit as claimed in claim 11 wherein the mirror is supported by a holder, and the window is defined in a cover movably supported on the upper surface of the dashboard to align with the optical axis, the cover attached to the holder through a connection member.

13. The on-vehicle display unit as claimed in claim 10 wherein the window is defined in a cover movable on the upper surface of the dashboard in conformity with a variable position of the image on the screen, and the cover has a plurality of bar plates which are joined to one another along a folding line intersecting with a movement direction of the cover, each bar plate being foldable along the folding line.

14. The on-vehicle display unit as claimed in claim 10 which further comprises a closing mechanism for closing and opening the window.

15. The on-vehicle display unit as claimed in claim 10 wherein the window is covered by a transparent cover having a surface facing upward from the dashboard, the surface being treated with by a reflection limiting process.

16. The on-vehicle display unit as claimed in claim 10 which further comprises a transparent cover for covering the window and a shade defined at a periphery of the window, the shade raised from the upper surface of the dashboard, the cover having a surface facing upward above the dashboard, the surface being able to reflect light projected on the surface toward the shade.

* * * * *